(12) United States Patent
Nixon et al.

(10) Patent No.: US 8,950,183 B2
(45) Date of Patent: Feb. 10, 2015

(54) ENGINE SYSTEM HAVING INTAKE CONDUIT WITH SURGE INHIBITOR AND METHOD

(75) Inventors: Jed W. Nixon, Lafayette, IN (US); Keith G. Rochford, Murrieta, CA (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 13/607,895

(22) Filed: Sep. 10, 2012

(65) Prior Publication Data

US 2014/0069095 A1   Mar. 13, 2014

(51) Int. Cl.
| F04D 27/00 | (2006.01) |
| F02M 35/10 | (2006.01) |
| F02B 31/00 | (2006.01) |
| F04D 29/44 | (2006.01) |
| F04D 29/42 | (2006.01) |
| F04D 27/02 | (2006.01) |
| F04D 29/70 | (2006.01) |

(52) U.S. Cl.
CPC ... *F02M 35/10262* (2013.01); *F02M 35/10091* (2013.01); *F02B 31/00* (2013.01); *F04D 29/441* (2013.01); *F04D 29/4213* (2013.01); *F04D 27/0215* (2013.01); *F04D 27/0207* (2013.01); *F04D 29/701* (2013.01); *F02M 35/10275* (2013.01)
USPC ............................................ 60/611; 415/116

(58) Field of Classification Search
CPC .................. F02M 35/10144; F02M 35/10157; F02M 35/10242; F02M 35/10262; F02M 35/10275; F02M 35/10295; F02M 35/1283; F04D 27/0207; F04D 27/0215; F04D 29/4213; F04D 29/441; F04D 29/701; F15D 1/001; F15D 1/0015; F15D 1/0025; F15D 1/02; F15D 1/08; Y02T 10/144

USPC ............... 60/605.1, 611, 612; 415/58.4, 58.5, 415/159, 203, 206, 914; 123/562
See application file for complete search history.

(56) References Cited

U.S. PATENT DOCUMENTS

| 3,922,108 A | * | 11/1975 | Benisek ........................ 415/116 |
| 4,204,586 A | * | 5/1980 | Hani et al. ..................... 181/229 |
| 4,206,600 A | * | 6/1980 | Feuling ........................... 60/312 |
| 4,538,555 A | * | 9/1985 | Kite ........................ 123/184.47 |
| 4,848,281 A | * | 7/1989 | McCord .................... 123/184.58 |
| 5,413,189 A | * | 5/1995 | Browning et al. ............. 181/268 |
| 6,408,624 B1 | | 6/2002 | Books et al. |
| 6,623,239 B2 | * | 9/2003 | Sahay et al. .................. 415/119 |
| 6,736,238 B2 | * | 5/2004 | Kerr ............................... 181/267 |
| 6,748,921 B1 | | 6/2004 | Surges |
| 6,945,048 B2 | | 9/2005 | Whiting |
| 7,360,518 B2 | | 4/2008 | Egan |
| 7,533,644 B2 | | 5/2009 | Deiss et al. |
| 2004/0255884 A1 | | 12/2004 | Arnold |
| 2009/0263234 A1 | * | 10/2009 | Yin ................................ 415/58.4 |
| 2009/0287397 A1 | * | 11/2009 | Massard et al. ................ 701/105 |
| 2011/0064571 A1 | * | 3/2011 | Lind et al. ...................... 415/206 |
| 2012/0023930 A1 | | 2/2012 | Lischer |
| 2012/0070274 A1 | * | 3/2012 | Ferrazzi ......................... 415/203 |
| 2012/0255526 A1 | * | 10/2012 | Liavag ........................... 123/542 |

* cited by examiner

*Primary Examiner* — Kenneth Bomberg
*Assistant Examiner* — Jason T Newton
(74) *Attorney, Agent, or Firm* — Baker Hostetler

(57) ABSTRACT

An engine system includes a plurality of turbochargers each including a compressor outlet fluidly connected to an intake manifold of an engine. A plurality of intake conduits are configured to each convey incoming combustion air to one of the turbochargers, and each includes a casing, and a duct within the casing having a surge inhibitor mounted thereon which includes a flow-directing surface oriented obliquely to an axis of the duct to direct combustion air leaked back out of the compressor inlet away from a discharging stream of combustion air exiting the duct. Related methodology is also disclosed.

20 Claims, 3 Drawing Sheets

ENGINE SYSTEM HAVING INTAKE CONDUIT WITH SURGE INHIBITOR AND METHOD

TECHNICAL FIELD

The present disclosure relates generally to a turbocharged internal combustion engine system, and relates more particularly to inhibiting turbocharger surge in such a system via directing backflowing combustion air in an intake conduit.

BACKGROUND

Turbocharged internal combustion engines utilize outgoing exhaust gas from the engine to pressurize intake air for combustion. In general terms, pressurizing the intake air increases the quantity of air entering the engine cylinders during an intake stroke, and allows more fuel to be utilized to increase available engine output torque and power. Turbochargers will often operate effectively over a reasonably broad operating range of speeds and loads for the engine to which they are coupled. Under certain conditions, however, disruptions to the flow of gases through turbochargers can occur and deleteriously affect engine operation. In particular, a phenomenon known in the art as surge occurs when there is localized or complete reversal of the flow of gases through a turbocharger, notably the compressor side. Surge can occur where there are relatively rapid speed changes in the engine coupled with certain pressure conditions in the compressor and/or turbine of a turbocharger, causing a disparity between compressor pressure and intake manifold pressure which results in reversal of flow. Certain other conditions can also destabilize compressor flow, causing surge and resulting in the engine either being starved for air, over-fueled, or experience some other problem which can eventually lead to turbocharger or engine damage or failure.

U.S. Pat. No. 6,408,624 to Books et al. is directed to a system for controlling transient compressor surge in a turbocharged engine, and proposes a control circuit responsive to an engine operating parameter such as engine speed to determine a fueling limit that is made higher under certain engine operating conditions or made lower under others, to avoid turbocharger compressor surge conditions. While the strategy proposed by Books et al. may be useful, it is not without drawbacks, among them it appears to be a relatively complicated strategy that is directed specifically to one type of turbocharger surge phenomenon.

SUMMARY

In one aspect, an internal combustion engine system includes an internal combustion engine having an intake manifold and an exhaust manifold, and a turbocharger including a turbocharger housing defining a compressor inlet and a compressor outlet fluidly connected to the intake manifold. The engine system further includes an intake conduit configured to convey incoming combustion air to the turbocharger. The intake conduit includes a casing, and a duct within the casing defining a longitudinal axis extending between a combustion air inlet and a combustion air outlet configured to discharge a stream of the incoming combustion air toward the compressor inlet. The intake conduit further includes a surge inhibitor mounted to the duct and having a flow-directing surface oriented obliquely to the longitudinal axis to direct combustion air leaked back out of the compression inlet away from the discharging stream.

In another aspect, a method of operating an engine system includes discharging a stream of combustion air from an outlet of a duct within an intake conduit for a turbocharger of the engine system, such that the combustion air is conveyed into a compressor inlet of the turbocharger. The method further includes compressing the combustion air conveyed into the compressor inlet via rotating a compressor of the turbocharger. The method still further includes limiting disturbance of the discharging stream by combustion air leaked back out of the compressor inlet at least in part by directing the leaked combustion air away from the discharging stream.

In still another aspect, an intake conduit for conveying incoming combustion air into a turbocharger in an internal combustion engine system includes a casing and a duct coupled to the casing and positioned at least partially therein. The duct defines a longitudinal axis extending between an upstream combustion air inlet configured to receive incoming combustion air, and a downstream combustion air outlet configured to discharge a stream of the incoming combustion air in an axial direction toward a compressor inlet of the turbocharger. The intake conduit further includes a surge inhibitor mounted to the duct and having a flow-directing surface oriented obliquely to the longitudinal axis to direct combustion air leaked back out of the compressor inlet away from the discharging stream.

DETAILED DESCRIPTION

Figure 1:
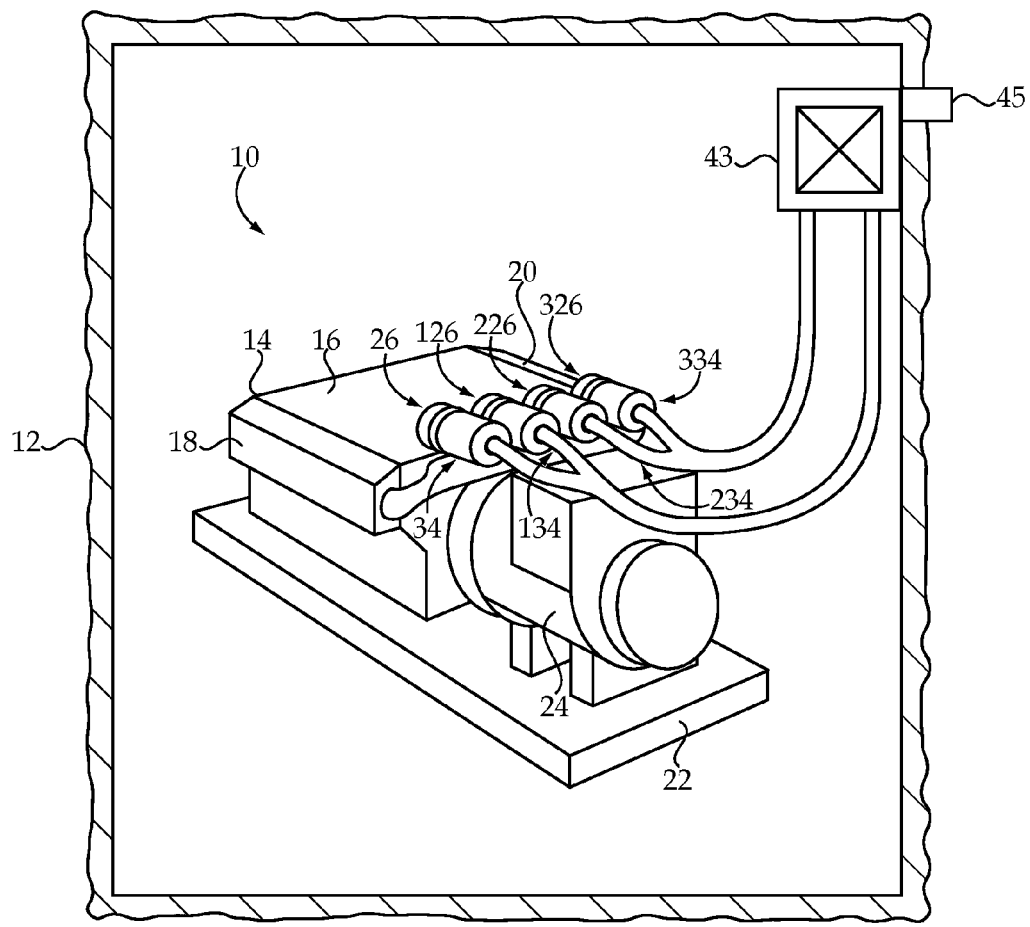
FIG. 1 is a diagrammatic view of an engine system according to one embodiment.

Referring to FIG. 1, there is shown an internal combustion engine system 10 according to one embodiment. System 10 includes an internal combustion engine 14 having an intake manifold 18 and an exhaust manifold 20 coupled with an engine housing 16. System 10 may be configured to drive a load 24 such as a generator, with both engine 14 and load 24 mounted upon a base 22 in a conventional manner. Engine 14 may include a compression ignition diesel engine in one embodiment, dedicated in service to powering load 24 and sold as a genset. Accordingly, system 10 may include suitable control electronics, cabling and the like for connecting system 10 with a local or regional power grid, for example, although such features are not shown in FIG. 1. System 10 is shown within an enclosure 12 which could be a building structure in a power generation facility, a marine vessel, or still another type of enclosure. In certain instances, system 10 will be one of a plurality of engine systems all located within the same enclosure. In such an implementation, it is common for outside fresh air to be supplied to the individual engines inside an enclosure, and engine exhaust discharged outside of the enclosure, for reasons which will be apparent to those skilled in the art.

To this end, engine system 10 may also include an air filter 43 receiving fresh outside air for combustion from a filter inlet 45. In other implementations, engine system 10 might be used for power generation in a land vehicle such as a truck, tractor or locomotive, or as the sole power supply in a marine vessel rather than in an array of other engine systems. Moreover, rather than electrical power generation, engine 14 might be configured to drive a pump, compressor, mechanical drive system of a mobile machine, or still another type of load. Engine 14 may be turbocharged, including a plurality of turbochargers 26, 126, 226, 326 configured to compress incoming combustion air for engine 14 and supply the same to intake manifold 18. A plurality of intake conduits 34, 134, 234, 334 are also provided and each configured to convey incoming combustion air to one of turbochargers 26, 126, 226, 326. As noted above, air filter 43 may filter incoming combustion air for engine 14, and in particular filter the incoming combustion air at a remote location for supplying into intake conduits 34, 134, 234, 334, each of which supplies the filtered incoming combustion air to one of turbochargers 26, 126, 226, 326. In other embodiments, filtered incoming combustion air could be supplied via a common plenum positioned upstream all of the turbochargers in an engine system, rather than a remotely positioned common air filter as in engine system 10. In this alternative design, surge inhibitors, to be described below, for each of the turbochargers could be positioned between each one of the turbochargers and the common plenum. For reasons which will be apparent from the following description, engine system 10 may be uniquely configured to inhibit turbocharger surge, and in many instances inhibit turbocharger surge resulting at least in part from "cross talk" between and among turbochargers in engine system 10.

Figure 2:
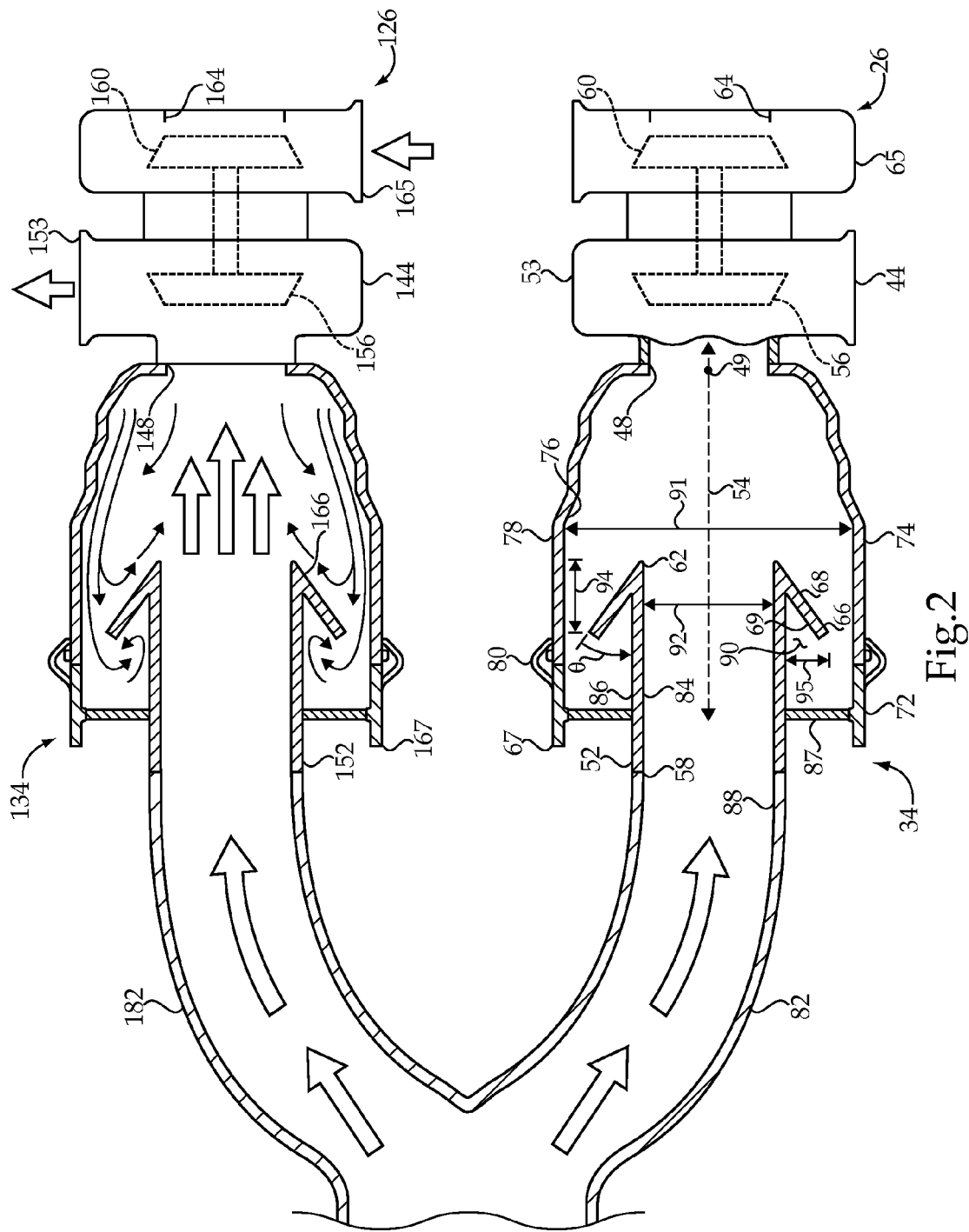
FIG. 2 is a partially sectioned side view of a portion of the engine system of FIG. 1.

Referring also now to FIG. 2, there is shown a partially sectioned side view through a portion of engine system 10, and in particular illustrating additional features of intake conduit 34 and intake conduit 134 coupled with their respective turbochargers 26 and 126. Each of turbochargers 26 and 126 may include a turbocharger housing 44 and 144, respectively, defining a compressor inlet 48 and 148, and a compressor outlet 53 and 153 fluidly connected to intake manifold 18. The term "fluidly connected" should be understood to mean any arrangement and number of components configured so that a fluid such as air and/or exhaust gases may be conveyed between two components so described. For instance, an aftercooler placed between a turbocharger and an intake manifold would not restrict those components from being understood as "fluidly connected." Each of turbochargers 26 and 126 may also include a compressor 56 and 156, respectively, and configured to compress combustion air conveyed into the corresponding compressor inlet 48, 148 via rotating. Each of turbochargers 26 and 126 may also include a turbine 60 and 160, respectively, configured to receive exhaust entering an exhaust inlet 65 and 165 in the corresponding turbocharger housing 44 and 144, and discharge the exhaust after inducing rotation of the corresponding turbine 60, 160 out of an exhaust outlet 64 and 164.

Each one of the intake conduits 34, 134, 234, 334 in engine system 10 may intersect a second one of the intake conduits such that a stream of incoming combustion air is split to simultaneously feed two turbochargers. To this end, each of intake conduits 34 and 134 includes an upstream pipe section 82 and 182 which are intersecting, and together form a V-pattern and a downstream section fed by the corresponding pipe section and discussed in further detail herein. In FIG. 2, certain structural and dimensional details of intake conduit 34 are identified by reference numerals, and specifically discussed herein. With regard to intake conduit 134, certain properties and characteristics of the flow of incoming combustion air are specifically discussed. The present description should be understood to refer analogously to either of intake conduits 34 or 134, as the respective components as well as their associated turbochargers may be identical and are discussed separately herein purely for convenience.

As noted above, intake conduit 34 may include a downstream section connected with pipe section 82 which receives incoming combustion air and conveys the same to turbocharger 26. The subject downstream section of intake conduit 34 may include a casing 67 and a duct 52 coupled to casing 67 and positioned at least partially therein. Duct 52 defines a longitudinal axis 54 extending between an upstream combustion air inlet 48 configured to receive incoming combustion air, and a downstream combustion air outlet 62. Combustion air outlet 62 is configured to discharge a stream of the incoming combustion air in an axial direction toward compressor inlet 48. In a practical implementation strategy, duct 52 includes a cylindrical inner duct surface 84 and a cylindrical outer duct surface 86 each extending between combustion air inlet 58 and combustion air outlet 62. Inner duct surface 84 is centered an axis 54. Casing 67 may include an upstream casing piece 72 coupled with a downstream casing piece 74, for example via a connecting mechanism 80 such as a latching connecting mechanism, the significance of which will be further apparent from the following description. Casing 67 includes an inner casing surface 76 and an outer casing surface 78. Inner casing surface 76 extends circumferentially around duct 52 such that a space extends radially between cylindrical outer duct surface 86 and inner casing surface 76 as shown in FIG. 2.

In a practical implementation strategy, intake conduit 34 further includes a duct mounting plate 87 coupled to casing 67 and supporting duct 52 within casing 67. Duct 52 includes an upstream end 88 attached to duct mounting plate 87 and having combustion air inlet 58 formed therein, inlet 58 being located downstream the location of intersection of pipe sections 82 and 182. In other words, pipe section 82 and 182 intersect upstream the inlets to the corresponding ducts. Duct 52 may further include a free downstream end 89 having combustion air outlet 62 formed therein. Upstream casing piece 72 may be attached to duct mounting plate 87 in one embodiment, and upstream casing piece 72 having a shorter axial length. Downstream casing piece 74 may have a longer axial length than upstream casing piece 72 as shown in FIG. 2. Duct 52 may have a longer axial length, measured from combustion air inlet 58 to combustion air outlet 62, and may be coupled to casing 67 in such a way that free downstream end 89 projects axially outwardly in a downstream direction from upstream casing piece 72. It may further be noted from FIG. 2 that an unobstructed gap extends in an axial direction between combustion air outlet 62 and compressor inlet 48. Longitudinal axis 54 may be oriented such that it intersects a radial center point 49 of compressor inlet 48. Combustion air outlet 62 is configured to discharge a stream of the incoming combustion air in an axial direction toward compressor inlet 48, and may be configured to discharge the stream such that the combustion air has a straight-line path toward compressor inlet 48 and traverses the unobstructed gap. Duct 52 may define an inner diameter dimension 92 which may about 6 inches in one embodiment. An inner diameter dimension of compressor inlet 48 may be equal to inner diameter dimension 92. Casing 67 may also define an inner diameter dimension 91 which may be about 14 inches in one embodiment. As used herein, the term "about" should be understood in the context of conventional rounding to a consistent number of significant digits. Accordingly, "about" 6 inches means from 5.5 inches to 6.4 inches.

As alluded to above, intake conduit 34 may be configured to inhibit turbocharger surge. Surge may have various causes, and undesirable effects ranging from fairly modest disruptions in the supply of compressed air to an engine intake manifold, to severe disruptions under abject surge conditions where total engine shutdown occurs or is triggered to prevent potentially catastrophic failure. One phenomenon believed to lead to turbocharger surge in engine systems of the general type contemplated herein is the leaking back of combustion air out of a compressor inlet and its disturbance of the discharging stream of incoming combustion air. For reasons which will be understood by those skilled in the art, it is generally desirable to "shoot" incoming combustion air as directly as possible at a compressor inlet, such that the stream of incoming combustion air might be thought of as a more or less coherent cylinder of flowing air that is in an ideal case filling all the available flow area into the compressor inlet.

Once the incoming combustion air is fed into the compressor inlet, it is worked by the compressor and thereby increased in pressure and temperature for feeding to the intake manifold in a conventional manner. Perturbations in pressure and/or flow of incoming combustion air and potentially even outgoing exhaust in engine systems, often from a pressure excursion in another turbocharger of the system, can cause combustion air increased in pressure and temperature to leak back out of the compressor inlet. This leaked combustion air, which can flow back in the form of a pulse, can disturb the discharging stream of incoming combustion air.

In view of limiting or even eliminating such disturbance, a surge inhibitor 66 is mounted to duct 52 and has a flow-directing surface oriented obliquely to axis 54. Flow-directing surface 68 of surge inhibitor 66 can direct the leaked combustion air away from the discharging stream of incoming combustion air. To this end, flow-directing surface 68 may be shaped such that it flairs radially outward from duct 52 in an upstream direction, and may define a frustoconical shape having a taper widening in the upstream direction. An inner surface or back surface 69 of surge inhibitor 66 may be oriented parallel to flow-directing surface 68 such that a space 90 is defined between surge inhibitor 66 and duct 52. In a practical implementation strategy, surge inhibitor 66 may have an axial length 94 equal to about 2 inches, and may flair outwardly from duct 52 a distance 95 equal to about 2 inches, such that flow-directing surface 68 defines an angle 0 relative to axis 54 equal to about 45°. A length of surface 68, measured from combustion air outlet 62 to the free upstream edge of surface 68, in the plane of the page of FIG. 2, may be equal to about 3 inches in certain embodiments.

Figure 3:
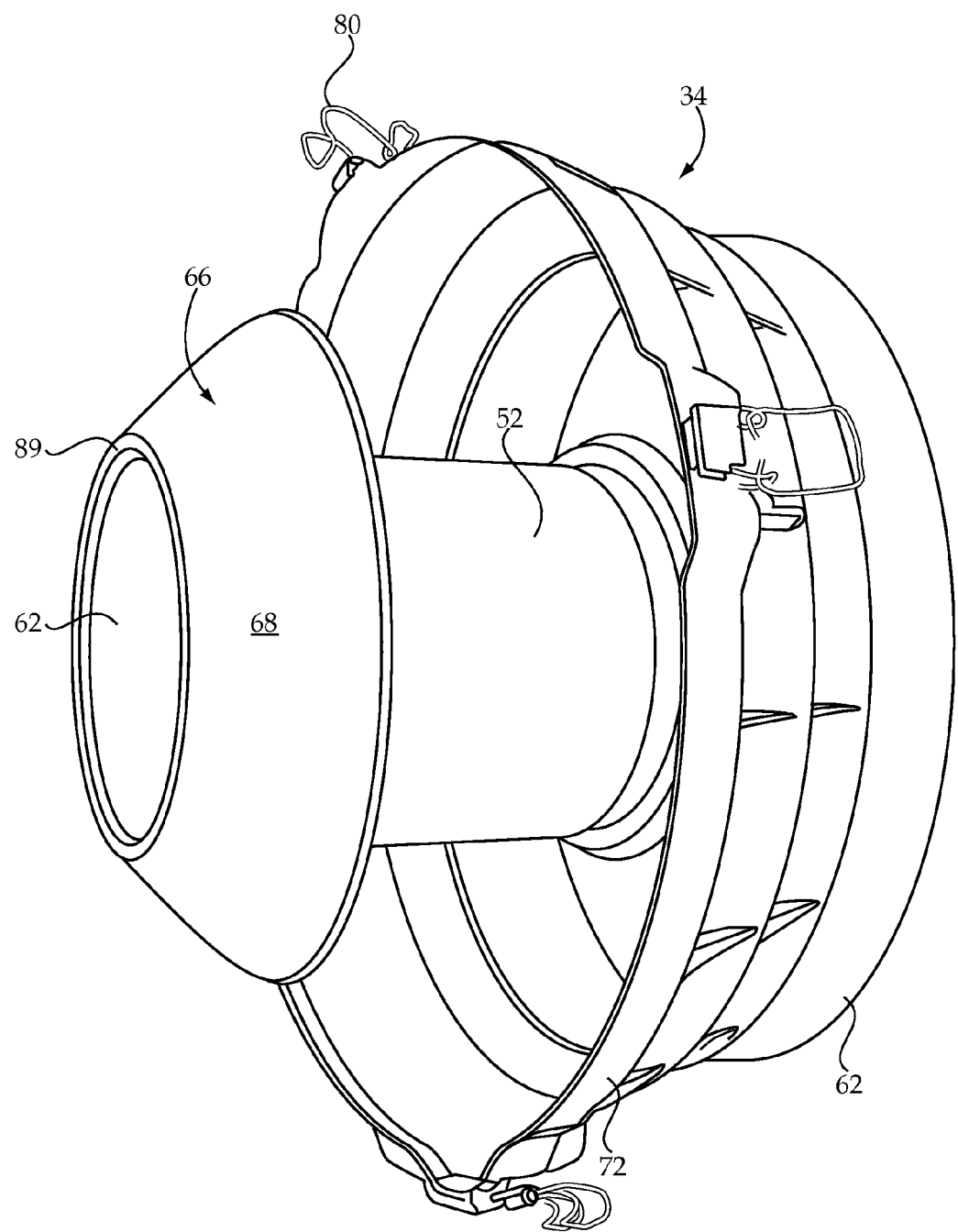
FIG. 3 is a perspective view of an intake conduit suitable for use in the engine system of FIGS. 1 and 2.

Referring also now to FIG. 3, there is shown a perspective view of a section of intake conduit 34 where the frustoconical shape defined by surface 68 is readily apparent. The intake conduit section may itself be understood as an intake conduit, since it serves the purpose of conveying incoming combustion air. As noted above, one or more connecting mechanisms 80 may be used to couple together the respective upstream and downstream casing pieces 72 and 74. In FIG. 3, connecting mechanism 80 is shown in the form of a latch, which can be uncoupled to separate the respective casing pieces. In certain known turbocharged engine system designs, an inlet canister similar to casing pieces 72 and 74 is used as a housing for an air filter. Accordingly, such known systems employ an air filter placed just upstream of a compressor inlet instead of the remote filtration contemplated herein. Among other things, utilizing a common air filter can provide cost and serviceability advantages over the use of individual close-coupled air filters for each turbocharger. In the course of research relating to remote filtration, it was discovered that individual close-coupled air filters tended to dampen pulses of back-flowing combustion air in such a way that surge was not problematic. Thus, in at least certain engine systems surge might be expected to become problematic only upon removing close-coupled individual air filters. The present disclosure thus contemplates intake conduit 34, and in particular the intake conduit section shown in FIG. 3, as being implemented as a replacement part where close-coupled filters are removed from an engine system and some strategy for managing surge needed. Accordingly, intake conduit 34, and in particular the intake conduit section shown in FIG. 3, can be swapped in for a component in an existing engine system which is similar but lacks a surge inhibitor.

Industrial Applicability

Referring to the drawings generally, but in particular now to intake conduit 134 and turbocharger 126 of FIG. 2, operation of engine system 10 will typically commence by starting engine 14 and rotating the turbines of each of the plurality of turbochargers, including turbine 160 in turbocharger 126 via exhaust from engine 14. Rotation of turbine 160 will rotate the corresponding compressor 156 to draw incoming combustion air through filter 43, thenceforth through pipe section 182. The solid arrows in pipe section 182 in FIG. 2 represent a flow of incoming combustion air. From pipe section 182, the incoming combustion air will enter duct 152 and discharge in a stream from the outlet of duct 152 to be conveyed into compressor inlet 148. The combustion air conveyed into compressor inlet 148 will be compressed within turbocharger 126 via the rotation of compressor 156. The compressed intake air increased in temperature and pressure will then be conveyed to intake manifold 18 for combustion with a fuel such as a distillate diesel fuel within a plurality of cylinders in engine housing 16. Exhaust from the combustion will be conveyed via exhaust manifold 20 to inlets of the turbochargers to rotate the corresponding turbines and maintain the air supply and exhaust in a conventional manner.

As discussed above, for a variety of reasons one or more of the turbochargers can experience a pressure excursion, resulting in a reversal of air flow within its compressor. This perturbation in flow or pressure may be communicated from the originating turbocharger to other turbochargers of engine system 10 via intake manifold 18. The phenomena relating to perturbations in one turbocharger being communicated to another turbocharger in an engine system is generally referred to as "cross talk." This phenomena can result in combustion air being leaked back out of a compressor inlet in one or more of the plurality of turbochargers, which for reasons explained above might disturb the discharging stream of incoming combustion air in one of the intake conduits but for the presence of a surge inhibitor as described herein. Those skilled in the art will appreciate that combustion air having been worked by a compressor will tend to be increased in pressure and temperature. Accordingly, the leaked air can have both a higher pressure and a higher temperature than the discharging stream of combustion air, and will tend to cool and expand as it leaks back from the compressor inlet. In FIG. 2 the solid arrows within casing 167 represent the discharging core stream of combustion air, whereas the single-line arrows represent example currents of the leaked combustion air generally traveling in an upstream direction around the discharging stream of incoming air and to at least a certain extent swirling circumferentially around the discharging stream.

It is believed that the leaked combustion air, which as described herein may be in the form of pulses, can affect the integrity of the discharging stream approaching the combustion inlet, such that the incoming combustion air eventually entering the compressor will be less uniform in flow direction and potentially other properties, increasing the likelihood of surging, unless some mechanism is provided to direct the leaked combustion air away from the discharging stream and allow it to decrease in pressure and temperature, for eventually entraining into the discharging stream. From FIG. 2 it can be seen that at least a portion of the leaked air is likely to impinge upon surge inhibitor 166 such that it is directed upstream from the discharging stream and behind surge inhibitor 166 where it can decrease in pressure and temperature and eventually circulate back towards the discharging stream for entrainment therein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An internal combustion engine system comprising:
    an internal combustion engine including an intake manifold and an exhaust manifold;
    a turbocharger including a turbocharger housing defining a compressor inlet, and a compressor outlet fluidly connected to the intake manifold;
    an intake conduit configured to convey incoming combustion air to the turbocharger; the intake conduit including a casing, and a duct within the casing and defining a longitudinal axis extending between a combustion air inlet, and a combustion air outlet within the casing and axially spaced from the compressor inlet such that the duct discharges a stream of the incoming combustion air through the casing and toward the compressor inlet; and
    the intake conduit further including a surge inhibitor having a flow directing surface mounted to the duct, the flow-directing surface being oriented obliquely to the longitudinal axis to direct combustion air leaked back out of the compressor inlet away from the discharging stream.

2. The engine system of claim 1 wherein the turbocharger is one of a plurality of turbochargers each having a turbocharger housing with a compressor outlet fluidly connected to the intake manifold, and the intake conduit is one of a plurality of identical intake conduits each configured to convey incoming combustion air to one of the plurality of turbochargers, and the engine system further comprising a common air filter coupled with each of the intake conduits to filter the incoming combustion air.

3. The engine system of claim 2 wherein each one of the intake conduits intersects a second one of the intake conduits at a location upstream the combustion air inlet of the corresponding duct to form a V-pattern.

4. The engine system of claim 3 wherein each of the ducts includes a cylindrical inner surface centered on the corresponding longitudinal axis, and a cylindrical outer surface having the surge inhibitor mounted thereon.

5. The engine system of claim 4 wherein an unobstructed gap extends between the combustion air outlet of each of the ducts and the corresponding compressor inlet, and the longitudinal axis of each of the ducts intersects a radial center point of the corresponding compressor inlet, and wherein each of the ducts defines an inner diameter dimension, and each of the compressor inlets defines an inner diameter dimension equal to the inner diameter dimension of the duct.

6. The engine system of claim 1 wherein the flow-directing surface flares radially outward from the duct in an upstream direction.

7. The engine system of claim 6 wherein the flow-directing surface defines a frustoconical shape.

8. The system of claim 7 wherein the intake conduit further includes a mounting plate coupled to the casing, and the duct has an upstream end attached to the corresponding mounting plate, and a free downstream end.

9. A method of operating an engine system comprising the steps of:
    discharging a stream of combustion air from an outlet of a duct, the outlet of the duct being within a casing of an intake conduit for a turbocharger of the engine system, such that the combustion air is conveyed through the casing from the outlet into a compressor inlet in a housing of the turbocharger;
    compressing the combustion air conveyed into the compressor inlet via rotating a compressor of the turbocharger; and
    limiting disturbance of the discharging stream by combustion air leaked back out of the compressor inlet at least in part by directing the leaked combustion air away from the discharging stream.

10. The method of claim 9 wherein the step of limiting further includes directing a pulse of leaked combustion air increased in pressure or temperature via working by the compressor.

11. The method of claim 10 wherein the step of limiting further includes directing combustion air leaked back out of the compressor inlet in response to a pressure excursion in another turbocharger of the engine system.

12. The method of claim 10 wherein the step of limiting further includes directing the leaked combustion air via a flow-directing surface in the intake conduit oriented obliquely to a direction of flow of the discharging stream.

13. The method of claim 12 wherein the flow-directing surface defines a frustoconical shape.

14. The method of claim 9 wherein the step of limiting further includes directing the leaked combustion air to flow upstream of the outlet, such that the leaked combustion air reduces in pressure or temperature, and further comprising a step of entraining the leaked combustion air reduced in pressure or temperature into the discharging stream.

15. The method of claim 9 wherein the step of discharging further includes discharging the stream such that the combustion air has a straight-line path toward the compressor inlet and traverses an unobstructed gap between the outlet and the compressor inlet.

16. The method of claim 15 further comprising a step of filtering the combustion air via a filter positioned upstream the intake conduit.

17. An intake conduit for conveying incoming combustion air into a turbocharger in an internal combustion engine system comprising:
    a casing;
    a duct coupled to the casing and positioned at least partially therein, the duct defining a longitudinal axis extending between an upstream combustion air inlet configured to receive incoming combustion air, and a downstream combustion air outlet within the casing and axially spaced from an end of the casing defining an opening configured to fluidly connect to a compressor inlet of the turbocharger, such that the duct discharges a stream of the incoming combustion air from the combustion air outlet in an axial direction through the opening in the end of the casing and into the compressor inlet of the turbocharger; and
    a surge inhibitor mounted to the duct and having a flow-directing surface oriented obliquely to the longitudinal axis to direct combustion air leaked back out of the compressor inlet away from the discharging stream.

18. The intake conduit of claim 17 wherein the duct further includes a cylindrical inner duct surface and a cylindrical outer duct surface each extending between the upstream combustion air inlet and the downstream combustion air outlet, and wherein the casing includes an outer casing surface and an inner casing surface extending circumferentially around the duct such that a space extends radially between the cylindrical outer duct surface and the inner casing surface.

19. The intake conduit of claim 18 further comprising a duct mounting plate coupled to the casing, and wherein the duct includes an upstream end attached to the duct mounting plate and having the combustion air inlet formed therein, and a free downstream end having the combustion air outlet formed therein, and wherein the casing has a shorter axial length, and the duct has a longer axial length such that the free downstream end projects axially outwardly from the casing.

20. The intake conduit of claim 19 wherein the flow-directing surface includes an outer surface of the surge inhibitor and defines a frustoconical shape having a taper widening in an upstream direction, and the surge inhibitor further including an inner surface oriented parallel to the outer surface.

\* \* \* \* \*

UNITED STATES PATENT AND TRADEMARK OFFICE
CERTIFICATE OF CORRECTION

PATENT NO. : 8,950,183 B2
APPLICATION NO. : 13/607895
DATED : February 10, 2015
INVENTOR(S) : Nixon et al.

Page 1 of 1

It is certified that error appears in the above-identified patent and that said Letters Patent is hereby corrected as shown below:

In the specification

Column 6, line 9, delete "Industrial Applicability" and insert -- INDUSTRIAL APPLICABILITY --.

Signed and Sealed this
Twelfth Day of January, 2016

Michelle K. Lee
*Director of the United States Patent and Trademark Office*